June 11, 1940.                    T. G. HARE                    2,203,684
VALVE
Filed March 1, 1939
Fig. 1.
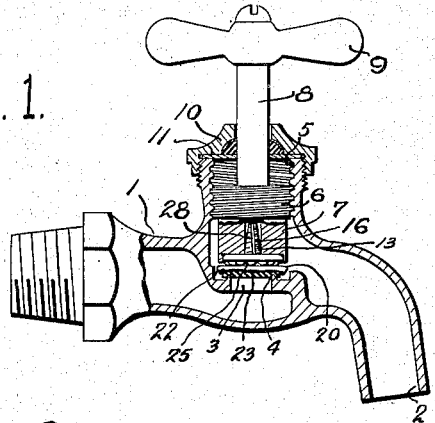
Fig. 2.
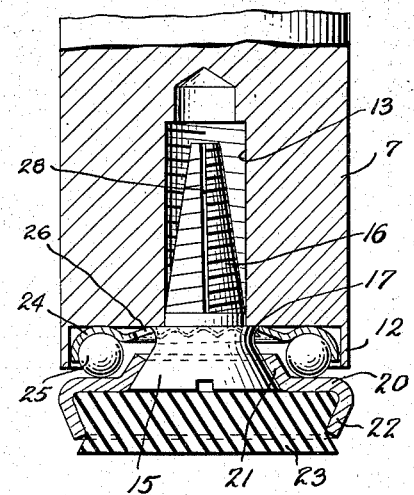
Fig. 3.
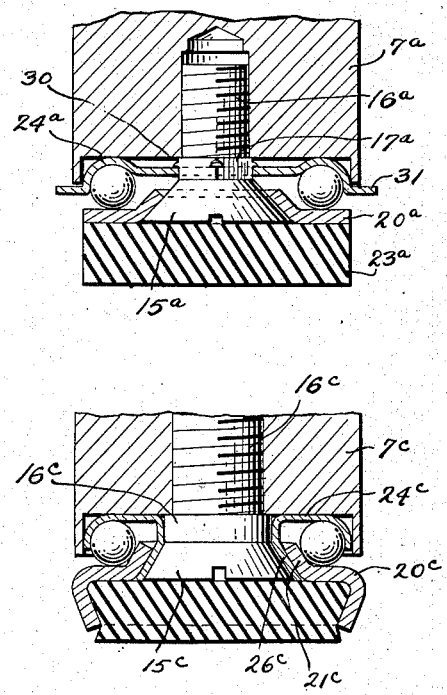
Fig. 4.
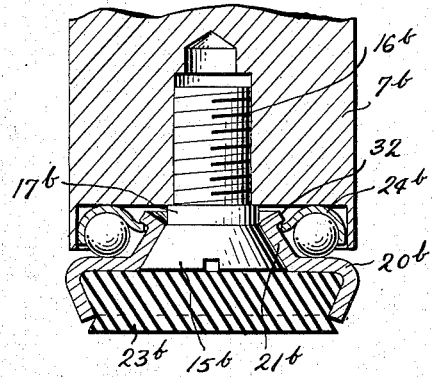
Fig. 5.
INVENTOR.
Terence G. Hare
BY Barnes, Kiselle, Laughlin & Raisch
ATTORNEYS Patented June 11, 1940

2,203,684

UNITED STATES PATENT OFFICE 2,203,684

VALVE

Terence G. Hare, Windsor, Ontario, Canada

Application March 1, 1939, Serial No. 259,193

5 Claims. (Cl. 251—46)

This invention relates to improvements in valve structures, and it has to do particularly with an improved arrangement for mounting a sealing member on a rotatable member with an antifriction bearing so that when the sealing member is moved into contact with a seat, it may be forced against the seat without relative movement between the sealing member and seat.

One of the objects of the invention is to provide an improved structure of this nature which requires very little space so that valves now in use, or valves of the present day structure, can have the antifriction bearing mounted therein without structural change in any of the valve parts. As a result the valve is left in a condition so that it may be equipped with the conventional sealing washer in the event the antifriction arrangement is removed for any reason. Then, too, valves in buildings can be equipped with the antifriction bearing without any change in the valve structures so that machining operations are eliminated.

Another object is to provide an antifriction arrangement which can be produced at low cost and supplied to the trade at low prices. Structures for carrying out the invention are shown in the accompanying drawing.

Fig. 1 is a view largely in cross section showing a valve equipped with an antifriction bearing of the present invention.

Fig. 2 is an enlarged cross sectional view taken through the stem and antifriction bearing structure.

Fig. 3 is a view similar to Fig. 2 showing a modified arrangement.

Fig. 4 is a cross sectional view similar to Fig. 2 illustrating a further modified arrangement.

Fig. 5 is a view similar to Fig. 2 showing a still further modified arrangement.

The present invention is particularly useful on faucets for water systems or the like and such a faucet is shown in Fig. 1, although the invention may be used in any sort of a valve. The faucet shown in Fig. 1 has a body 1, with an outlet 2, a port 3 defined by a seat 4. This is more or less a conventional faucet structure. The faucet or valve is controlled by a movable valve stem 7 which has a screw-threaded portion 6 engaging internal threads 5 of the body and a stem 8 which may be turned by a handle 9. The stem extends through a cap 10 which may be screw-threaded to the valve body, and an intermediate washer 11 may be used.

The stem is shown in enlarged form in Fig. 2, and usually the stem has a recessed formation at its lower end defined by a circumferential shoulder 12. The ordinary sealing washer is designed to be placed in this recess and secured in position by a screw passing through the washer and threaded into the internally threaded bore 13.

The present invention provides an antifriction bearing and washer arrangement designed to be placed upon this stem without change of the stem in any way. To this end, a screw is provided in the form shown in Fig. 2 having a tapered head 15 and a screw-threaded body 16. The head tapers down to a reduced diameter where it has a circumferential enlargement 17.

A race member, which is the lower race, is formed of relatively thin sheet metal, this race member being shown at 20, and the central portion is flared as at 21 so that it fits on the tapered head of the screw. A peripheral edge 22 is fashioned to extend inwardly so that a sealing washer 23 may be pressed into position and be held therein. Another race member 24 fashioned to more or less fit the antifriction balls 25 is designed to be received in the recess in the stem and has a central aperture arranged to be snapped over the shoulder 17. To this end the central aperture may be bounded by a wall of sinuous formation or corrugated shape, thus providing teeth 26 for engaging on the under side of the shoulder 17. This sinuous formation increases the flexibility of the inner portion of the upper race.

In making the assembly the races may be located with the balls therebetween and then the screw may be forced into position with the shoulder 17 snapping past the teeth 26, at which time the screw holds the parts assembled. The structure may be sold to the trade thus assembled, with the washer 23 in or out of position. The installation in the valve is made by turning the screw home, at which time the shoulder 17 abuts the stem. Then the washer 23 may be located. This locating of the washer must take place subsequently to the locating of the screw, since the washer covers the screw head. The races 20 and 24 may be made of suitable metal, preferably of the corrosion resistant type, and one advantageous metal is a form of stainless steel. The balls are also preferably of stainless or non-corrodible metal such as a bronze or brass, or, for that matter, a stainless steel.

The screw 16 may be made to accurately fit the threads in the bore 13. However, the faucets for domestic use have different sized threads, some of which vary, for example, from 24, 28 to 32 per inch. The screw 16 is of the self-threading type, having a tapered body formed with kerfs 28. A screw of this type fashioned with a 28-per inch thread may be used for valves with a 24 per inch or 32 per inch thread, and the screw will slightly distort the thread in the stem but will retain its position therein. The distortion is not such as to prevent the reinsertion of a proper screw into the recess. The above specifications are given as examples only.

In Fig. 3, the stem 7a is as above described, while the screw has a tapered head 15a and threaded body 16a and an intermediate polygonal shaped part 17a. The lower race 20a does not have a peripheral flange but the washer 23a is vulcanized or permanently attached thereto. The upper race 24a has a central portion fitting over the squared part 17a and preferably the corners of the squared part 17a are peened over as at 30 to hold the screw, the races and the balls in assembly. The upper race has an outer peripheral projecting part or flange 31. In installing this assembly with the stem the screw is turned by turning forces applied to the upper race at the peripheral part 31, until the intermediate part 17a is forced home against the stem.

In Fig. 4, the stem 7b is the same as above described, but the upper and lower races are interlocked with each other, the lower race 20b having its central portion 21b extending upwardly and into the upper race 24b where the edge may be fashioned over as at 32. Thus in this form the two races hold themselves in assembly. The screw in this form has a tapered head 15b, a screw-threaded portion 16b and an intermediate part 17b which butts against the stem 7b.

In Fig. 5 the stem 7c and the screw are the same as that shown in Fig. 4. In this form, however, the upper race 24c has its central portion fashioned downwardly as at 26c to lock over the portion 21c of the lower washer 20c. Thus in this form the two races with the balls therebetween constitute an assembled unit.

In Figs. 3, 4 and 5 a screw is shown of the ordinary type for a screw-threaded connection with the valve stem, while in Figs. 1 and 2 a self-threading screw is shown. It is to be understood, however, that a self-threading screw may be used with any one of the forms, and an ordinary or non-self-threading screw may be used with any one of the forms. It will be noted that the races are of thin metal and the balls are quite small so that the washer and antifriction bearing assembly require a minimum dimension measured longitudinally of the stem, so that the arrangement can be embodied in a faucet and stem without changing the structure thereof and still the faucet or valve provided with an adequate opening when the valve is opened. As shown in Fig. 1 there is an adequate vertical movement of the stem 7 for the opening of the valve, or in other words for lifting the washer from the seat 4. In some cases the gasket 11 may be thickened to elevate the cap 10 where it is necessary to increase the vertical movement of the stem.

I claim:

1. In a valve having a passageway defined by a seat and having a control stem mounted on threads so that rotary movement causes the stem to move toward and away from the seat, two race members, a plurality of balls between the race members, a screw member passing through the race members and threaded into the stem, said screw member having a head for rotatably engaging one race member to hold the one race member in position, said screw member having an enlargement spaced from the end of the head for abutment against the end of the stem, the second race member having its central portion fashioned into interlocking engagement with one of the other of said members for holding the race members and the balls in sub-assembly independently of the stem, and a sealing member carried by the said one race member for engaging the seat.

2. In a valve having a passageway defined by a seat and having a control stem mounted on threads so that rotary movement causes the stem to move toward and away from the seat, two race members, a plurality of balls between the race members, a screw passing through the race members and threaded into the stem, said screw having a head for rotatably engaging one race member to hold the one race member in position, said screw having an enlargement spaced from the end of the head for abutment against the end of the stem, the second race member having a central aperture smaller than the cross dimension of the enlargement and arranged to be snapped with spring action over the same whereby the stem holds the race members and balls in assembly thereon, and a sealing member carried by the said one race member for engaging the seat.

3. In a valve having a passageway defined by a seat and having a control stem mounted on threads so that rotary movement causes the stem to move toward and away from the seat, two race members, a plurality of balls between the race members, a screw passing through the race members and threaded into the stem, said screw having a head for rotatably engaging one race member to hold the one race member in position, said screw having an enlargement spaced from the end of the head for abutment against the end of the stem, the second race member fitting around the said enlargement and non-rotatably associated therewith, a sealing member secured to the said one race member for engaging the seat and covering the head of the screw, the second race member having laterally extending portions engageable for turning the said race member and screw for threading the screw into the stem.

4. In a valve having a passageway defined by a seat and having a control stem mounted on threads so that rotary movement causes the stem to move toward and away from the seat, two race members, a plurality of balls between the race members, a screw passing through the race members and threaded into the stem, said screw having a head for rotatably engaging one race member to hold the one race member in position, said screw having an enlargement spaced from the end of the head for abutment against the end of the stem, the second race member fitting around the said enlargement and non-rotatably associated therewith, a sealing member secured to the said one race member for engaging the seat and covering the head of the screw, the second race member having laterally extending portions engageable for turning the said race member and screw for threading the screw into the stem, some of the metal of the said enlargement of the stem being peened over so that the race members and balls are held in assembly by and with the screw.

5. In a valve having a passageway defined by a seat and having a control stem mounted on threads so that rotary movement causes the stem to move toward and away from the seat, two race members, a plurality of balls between the race members, a screw passing through the race members and threaded into the stem, said screw having a head for rotatably engaging one race member to hold the race member on the stem and having a shoulder spaced from the end of the head of the screw for abutment against the end of the stem, the central portion of one of the race members being fashioned to extend in a direction axially of the screw and into interlocking engagement with the central portion of the other race member for holding the race members and balls in assembly.

TERENCE G. HARE.